US 6,697,095 B2

(12) United States Patent  (10) Patent No.: US 6,697,095 B2
Hideshima  (45) Date of Patent: Feb. 24, 2004

(54) IMAGE RECORDING METHOD AND APPARATUS

(75) Inventor: Takahiro Hideshima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/352,139

(22) Filed: Jan. 28, 2003

(65) Prior Publication Data

US 2003/0136286 A1 Jul. 24, 2003

Related U.S. Application Data

(62) Division of application No. 09/479,670, filed on Jan. 10, 2000, now Pat. No. 6,543,349.

(30) Foreign Application Priority Data

Jan. 8, 1999 (JP) .............................. 11-3278
Apr. 14, 1999 (JP) .......................... 11-107090

(51) Int. Cl.$^7$ .......................... B41J 2/435; B41J 2/385
(52) U.S. Cl. ...................... 347/234; 347/116
(58) Field of Search ............................... 347/116, 233, 347/234, 235, 248, 250; 101/171

(56) References Cited

U.S. PATENT DOCUMENTS

| 5,610,721 A | 3/1997 | Higuchi et al. ............. 358/296 |
| 5,631,691 A | 5/1997 | Furuta et al. .............. 347/235 |
| 5,680,168 A | 10/1997 | Kokubo et al. ............. 347/175 |
| 5,854,958 A | * 12/1998 | Tanimoto et al. ............. 399/49 |
| 6,198,490 B1 | 3/2001 | Eom et al. .................. 347/116 |
| 6,204,865 B1 | 3/2001 | Noguchi et al. ............ 347/116 |

FOREIGN PATENT DOCUMENTS

JP  7-302014  * 11/1995  .......... G03G/15/22

* cited by examiner

Primary Examiner—Hai Pham
(74) Attorney, Agent, or Firm—Sughrue Mion, PLLC

(57) ABSTRACT

The present invention is an image recording method and apparatus for recording an image represented by at least two sets of image data separated by colors. Based on the image data, images corresponding to the image data are each recorded on different sections of photosensitive material moving in a sub-scan direction, while the photosensitive materials subjected to main scan by a plurality of light beams. Thereafter, the sections of the photosensitive material are superimposed over one another to produce the final image. Relative positions of the images on each section of photosensitive material are provided to substantially coincide with each other by setting a selected number of blank raster lines in a first main scan for each section of the photosensitive material. As a result, an amount of displacement of each of images on the photosensitive materials is reduced when the sections of photosensitive material are superimposed and aligned with one another to produce the final image. Preferably a blade is used for cutting the photosensitive material into different sections.

10 Claims, 8 Drawing Sheets

F I G. 1
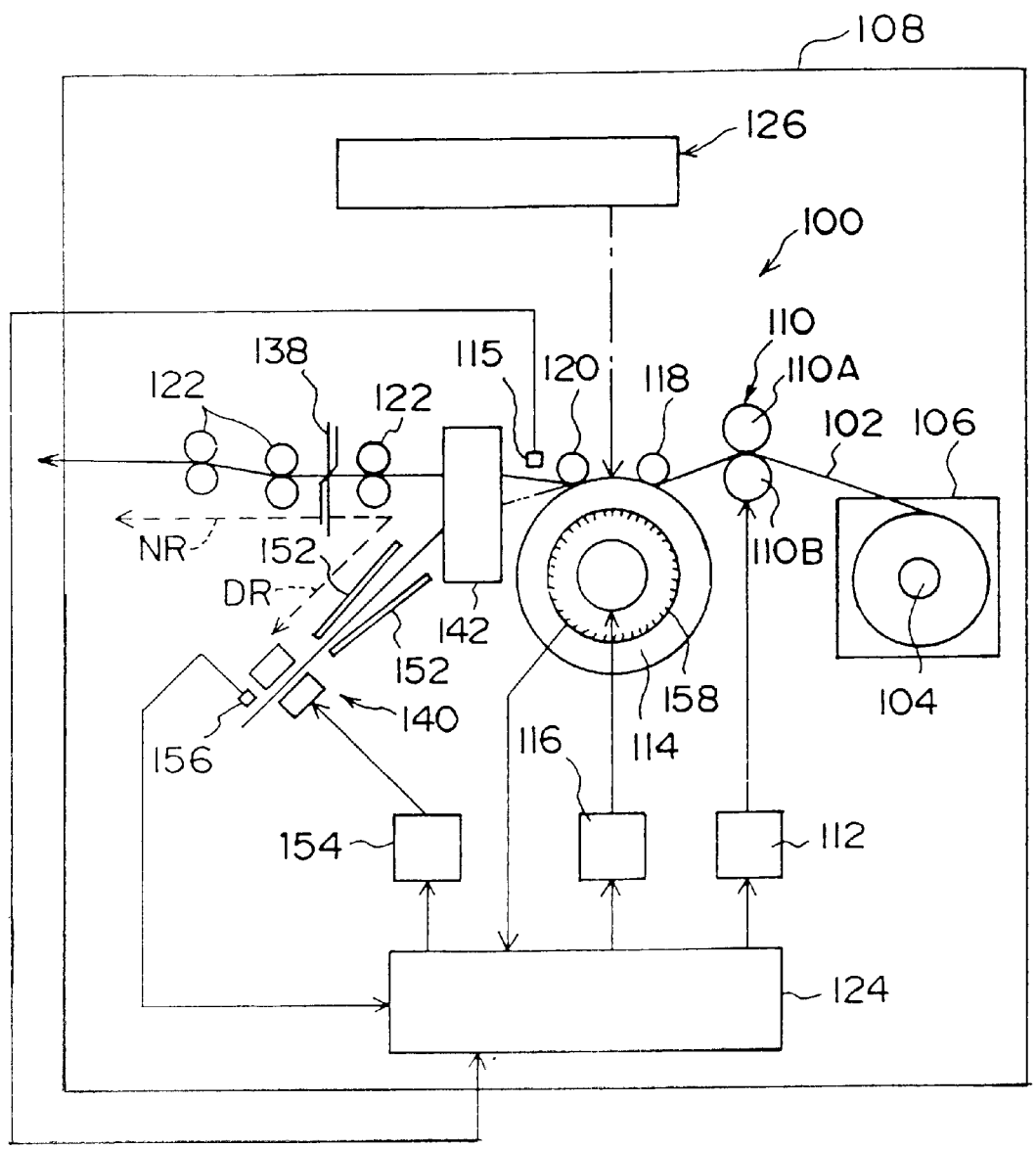

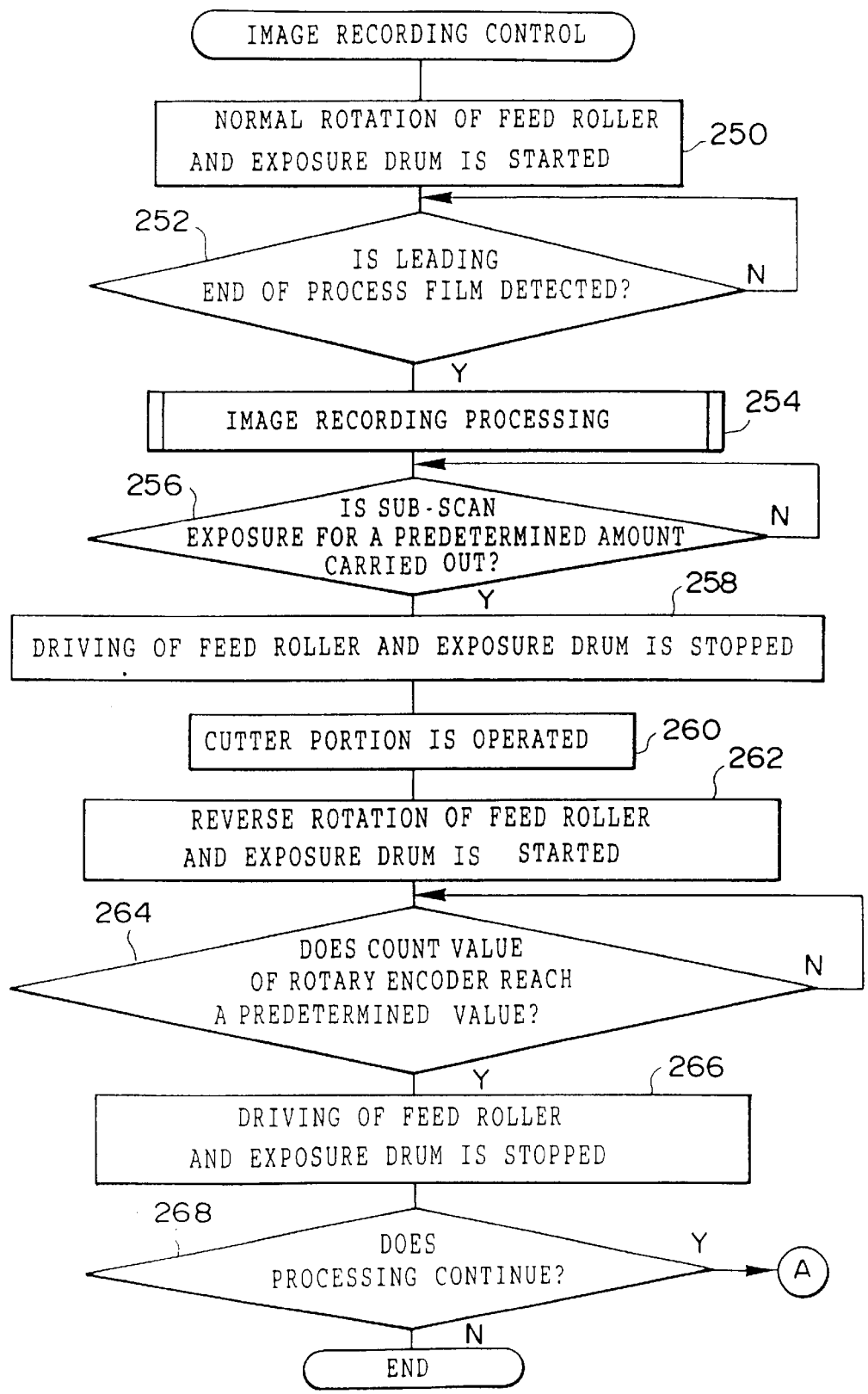

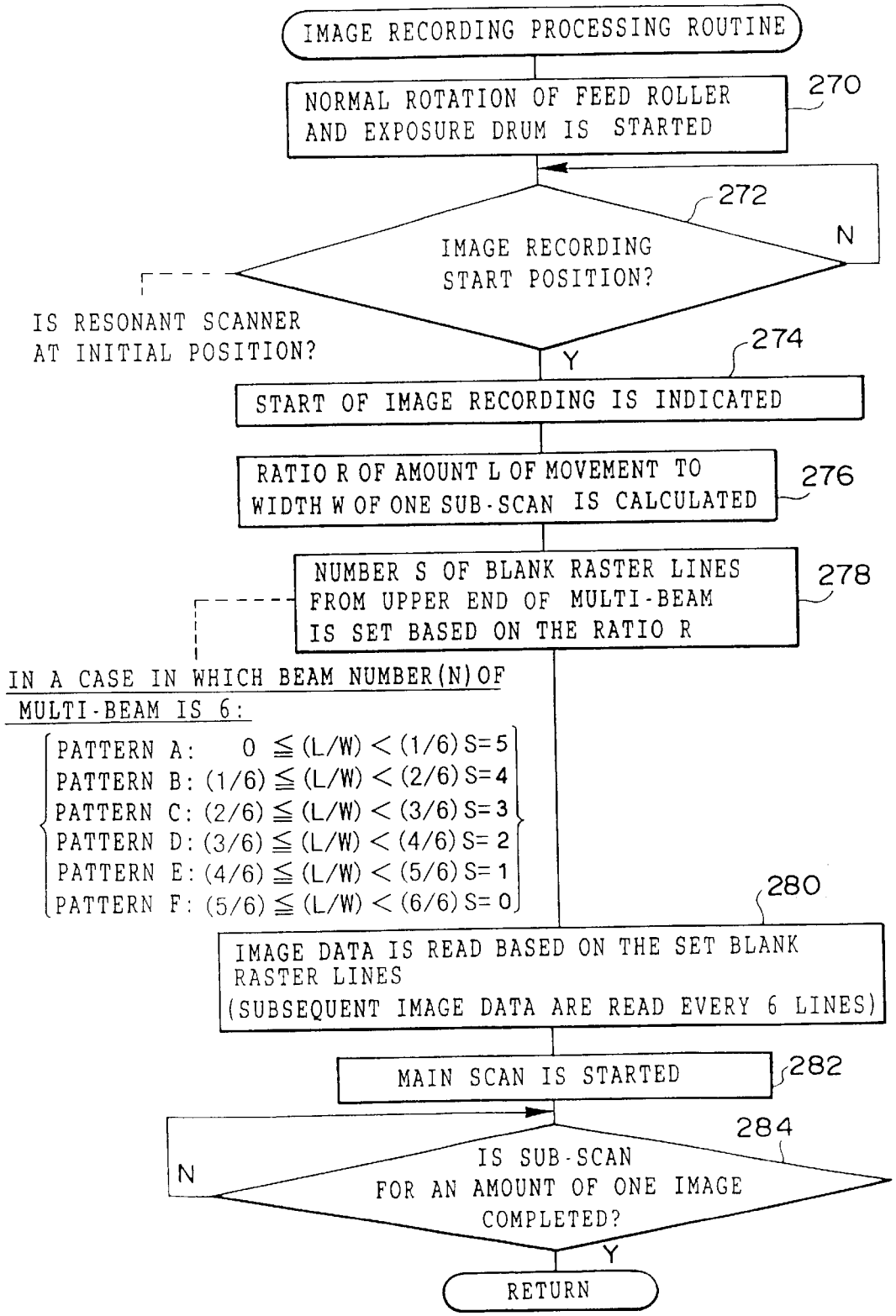

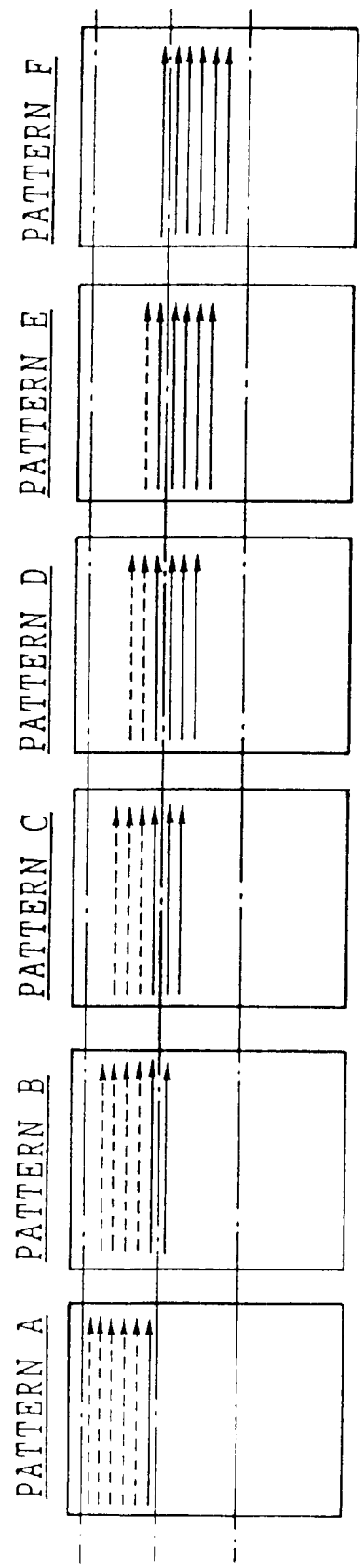

IMAGE RECORDING METHOD AND APPARATUS

This is a divisional of application Ser. No. 09/479,670 filed Jan. 10, 2000 now U.S. Pat. No. 6,543,349 issued Apr. 8, 2003; the disclosure of which is incorporated herein by reference.

BACKGROUND OF THE INVENTION

1. Field of the Invention

The present invention relates to an image recording method and apparatus using a multi-beam, in which an image is recorded by moving a plurality of light beams relatively to a sub-scan direction of a photosensitive material and simultaneously carrying out main scan of a plurality of light beams, namely, an image recording method and apparatus in which an image is recorded on a photosensitive material by carrying out main scan of a plurality of light beams while the photosensitive material is being moved in a sub-scan direction.

2. Description of the Related Art

There has conventionally been known, as a method of recording an image on a photosensitive planographic printing plate such as a PS plate, a method in which a photographic film for plate-making (process film) on which the image is recorded is superposed on the photosensitive planographic printing plate.

The photographic film for plate-making on which the image is recorded is generated by image recording processing of an image recording apparatus referred to as a film setter, and development processing of a developing apparatus.

A magazine in which an elongated photographic film for plate-making wound in a layered form is accommodated is set in the film setter.

An exposure drum is rotated at a predetermined speed so as to move the photographic film for plate-making in a sub-scan direction. An image recording apparatus is disposed in a radial direction of the peripheral surface of the exposure drum on which the photographic film for plate-making is closely held.

The image recording apparatus distributes (swings) a plurality of light beams emitted from a laser in an axial direction of the exposure drum by a plurality of optical systems (main scan by a multi-beam system). As a result, main scan is carried out with the plurality of light beams while the photographic film for plate-making is being subjected to sub-scan, and the main scan is carried out repeatedly. The light beams are subjected to on-off control (or duty control) based on image information, and therefore, a predetermined image is recorded on the photographic film for plate-making.

The photographic film for plate-making on which an image is recorded is guided to an ordinary conveying path and discharged from the film setter, and further conveyed to a developing apparatus in a subsequent process.

When a print obtained from a photosensitive planographic printing plate is a color image, it is necessary that photosensitive planographic printing plates be provided respectively for four color components of cyan (C), magenta (M), yellow (Y), and black (K), that is, four sheets of photosensitive planographic printing plate, be prepared for each image.

Respective relative positions of images recorded on four photosensitive planographic printing plates are provided to coincide with one another, and a print of a full-color image can be obtained with four images overlapping with one another.

During recording of images, sub-scan movement of the photographic film for plate-making constantly continues, and therefore, recording of an image is started from a starting position of image recording (an initial position in a region to which light beam is applied in main scan), which comes first after a leading end of the photographic film for plate-making, that is, a position of a line at which main scan can be started, has been detected by the image recording apparatus. At this time, there is no correlation between the sub-scan movement of the photographic film for plate-making and the main scan of light beam.

Accordingly, respective images of the component colors are recorded in a state of being displaced from one another by an amount of about one sub-scan at the maximum. The amount of one sub-scan becomes larger in the widthwise dimension as a beam number of a multi-beam (the number of light beams) increases. For example, when exposure is carried out for 96 lines/mm using 6 light beams, a beam pitch is about 10 $\mu$m, and therefore, the maximum amount of displacement becomes 60 $\mu$m. An allowable amount of displacement in a print is limited to 100 $\mu$m at its maximum, and if an amount of displacement at a starting position of writing amounts to 60% or more of the allowable amount of displacement, the displacement caused by other factors such as a conveying system, a positioning punch hole, and the like is hardly allowed. As a result, color displacement occurs to thereby deteriorate image quality.

SUMMARY OF THE INVENTION

In view of the above-described circumstances, an object of the present invention is to provide an image recording method and apparatus in which an amount of displacement of relative positions of images on a plurality of photosensitive materials can be limited to a pitch of one line irrespective of the beam number of a multi-beam and deterioration of image quality caused by color displacement or the like can be prevented.

A first aspect of the present invention is an image recording method, comprising the steps of: (a) providing at least two sets of image data separated by color, for an image; (b) recording a separated image corresponding to each set of image data on a section of photosensitive material moving in a sub-scan direction while the photosensitive material is being subjected to main scanning by a plurality of light beams; and (c) providing for relative positions of separated images on the section of photosensitive materials to substantially coincide with each other by setting a blank raster line in a first main scan for each section of the photosensitive material.

A second aspect of the present invention is an image recording method according to the first aspect, wherein in the step of providing for relative positions of the images, the number of blank raster lines in the first main scan is set for each section of the photosensitive material, based on a distance between a predetermined reference position on each section of the photosensitive material and a position at which the first main scan is started on that section.

A third aspect of the present invention is an image recording method according to the second aspect, wherein as the distance between the predetermined reference position and the position at which the first main scan is started becomes smaller, the number of blank raster lines is set larger.

A fourth aspect of the present invention is an image recording method according to the second aspect, wherein the upper limit of the number of blank raster lines is equal to the number of light beams in the plurality of light beams, minus one light beam.

A fifth aspect of the present invention is an image recording method according to the first aspect, wherein the blank raster lines are set in order from a leading end of the sheet of photosensitive material, the blank lines being substantially transverse to a direction in which the sheet of photosensitive material is conveyed.

A sixth aspect of the present invention is an image recording apparatus for recording an image on photosensitive material, wherein the image is represented by at least two sets of image data separated by color, the apparatus comprising: (a) image recording means for recording a separated image corresponding to each set of image data on a section of photosensitive material, by carrying out main scans of the photosensitive material with a plurality of light beams; (b) photosensitive material detecting means for detecting that a section of photosensitive material has been conveyed to a position at which an image can be recorded thereon; (c) state detecting means for detecting a state in which a main scan by the plurality of light beams can be started; (d) controlling means for controlling starting a main scan by the plurality of light beams, when the controlling means being in communication with the state detecting means receiving a signal therefrom that a main scan can be started and the photosensitive material detecting means has detected that a section of photosensitive material has been conveyed to a position at which an image can be recorded thereon; (e) calculation means for calculating an amount of distance by which a section of photosensitive material is conveyed, between a time when the photosensitive material detecting means detects that a section of photosensitive material has been conveyed to a position at which an image can be recorded thereon, and a time when the state detecting means detects a state in which a main scan by the plurality of light beams can be started; and (f) setting means for setting a number of blank raster lines in a first scan for each section of photosensitive material.

A seventh aspect of the present invention is an image recording apparatus according to the sixth aspect, wherein the number of blank raster lines in the first main scan is set based on the amount of distance by which the section of photosensitive material is conveyed.

An eighth aspect of the present invention is an image recording apparatus according to the sixth aspect, wherein as the amount of distance by which the photosensitive material is conveyed becomes smaller, the number of blank raster lines set by the setting means increases.

A ninth aspect of the present invention is an image recording apparatus according to the sixth aspect, wherein the upper limit of the number of blank raster lines is smaller than the number of the plurality of light beams by one.

A tenth aspect of the present invention is an image recording apparatus according to the sixth aspect, wherein the section of photosensitive material includes a leading end and the blank raster lines are set in order from the leading end of the section of photosensitive material in a direction in which the photosensitive material is conveyed.

An eleventh aspect of the present invention is an image recording apparatus for recording an image on a photosensitive material, wherein the image is represented by at least two sets of image data separated by color, the apparatus comprising: (a) a conveyor for conveying photosensitive material along a conveying path; (b) an image recording section having a scanner, in which a plurality of light beams is directed from the scanner across the conveying path for scanning an image onto photosensitive material being conveyed therealong, the image recording section providing a signal indicative of when scanning by the resonant scanner can begin; (c) a sensor which provides a signal indicative of a position of the photosensitive material along the conveying path; and (d) a controller receiving the image data and being in communication with the image recording section and the sensor, the controller receiving the signals from the image recording section and the sensor, and controlling the image recording section to record an image for each set of image date on different sections of the photosensitive material, the controller determining an amount a section of photosensitive material has been conveyed along the conveying path based on when the controller received a signal from the sensor and a signal from the image recording section, wherein the controller controls the image scanning section to set a number of blank raster lines in a first scan of each section of photosensitive material, based on the amount that the respective section of photosensitive material has been conveyed.

A twelfth aspect of the present invention is an image recording apparatus according to the eleventh aspect, wherein the scanner is a resonant type scanner.

A thirteenth aspect of the present invention is an image recording apparatus according to the eleventh aspect, wherein the number of blank raster lines decreases as the amount that the respective section of photosensitive material has been conveyed, increases.

A fourteenth aspect of the present invention is an image recording method in which an image is separated into plural image data based on plural colors, and based on the image data, an image is recorded on a photosensitive material corresponding to each of the image data by carrying out main scan of a plurality of light beams synchronously with moving the plurality of light beams relatively to a sub-scan direction of the photosensitive material, the method comprising the steps of: setting, based on a distance from a predetermined reference position on each photosensitive material to a position at which first main scan is started, the number of blank raster lines in the first main scan; and setting the blank raster lines from a leading end of the photosensitive material in a direction in which the photosensitive material is conveyed.

A fifteenth aspect of the present invention is an image recording method according to the fourteenth aspect, wherein the number of blank raster lines in the first main scan is set for each of the photosensitive materials so that a position at which main scan is started, which position including first image data, with respect to the predetermined reference position is substantially registered on each of the photosensitive materials.

A sixteenth aspect of the present invention is an image recording method using a multi-beam, in which one image data is separated into at least two colors, and based on the image data separated into at least two colors, an image is recorded by image recording means carrying out main scan of a plurality of light beams for an image while moving light beams relatively to a sub-scan direction of each of photosensitive materials. In this method, based on an amount of displacement of the photosensitive material in the sub-scan direction between a predetermined reference position and a position of a line at which main scan is started, blank raster lines of non-image data are set sequentially from the top of the plurality of light beams during the first main scan.

A seventeenth aspect of the present invention is an image recording method using a multi-beam, in which an image is recorded by dividing one image data into at least two colors and by carrying out main scan of a plurality of light beams for an image by image recording means while moving light beams relatively to a sub-scan direction of each of photosensitive materials. This method comprises the steps of: obtaining an amount of displacement in the sub-scan direction of each of photosensitive materials corresponding to the same image from a predetermined reference position to a position of a line at which main scan is started; setting the number of blank raster lines sequentially from a leading end of the photosensitive material in the sub-scan direction during main scan for other photosensitive materials so that the amount of displacement of a photosensitive material located at the position of a line at which main scan is started, with the amount of displacement being made largest, is limited to a pitch of one line at the maximum; and setting the top of lines not including the blank raster lines as an apparent position of a line at which main scan is started.

An eighteenth aspect of the present invention is an image recording apparatus using a multi-beam, in which based on image data obtained by separating one image into colors of cyan (C), magenta (M), yellow (Y), and black (BK), an image is recorded by carrying out main scan of N (N is an integer of 2 or more) light beams by image recording means while moving light beams relatively to a sub-scan direction of a photosensitive material. This apparatus comprises: photosensitive-material detecting means which is provided on a conveying path (a conveying path of the photosensitive material or a conveying path of light beams) along which light beams are moved relatively to the sub-scan direction of the photosensitive material and which detects a relative position of a line at which main scan is started between the photosensitive material and the light beams; main-scan-starting-position detecting means for detecting a position where recording of an image is started in the main scan; start-of-main-scan controlling means which controls the image recording means so as to start main scan after the photosensitive material and the light beams have reached the relative position of a line at which main scan is started by a signal from the photosensitive-material detecting means and when a signal from the main-scan-starting-position detecting means; calculation means which calculates an amount L of relative displacement between the photosensitive material and the light beams until the main scan is started from the relative position of a line at which main scan is started between the photosensitive material and the light beams; and blank raster line setting means which sets, based on a ratio R ($0 \leq R < 1$) of the amount of movement L calculated by the calculation means to a previously known amount of movement W in one sub-scan, blank raster lines sequentially from a leading end of the photosensitive material in the sub-scan direction, which blank raster lines increases as the ratio R becomes smaller with the upper limit of the number of blank raster lines, N−1, being smaller than the number N of light beams by one in the first main scan by the image recording means.

According to the first aspect of the present invention, when one image is formed by superposing separated images recorded on the respective photosensitive materials one another, it is necessary that relative positions of the separated images on the respective photosensitive materials be provided to coincide with one another so that the separated images can be properly superposed on one another.

When the images are recorded by repeatedly carrying out main scan while the photosensitive materials are being subjected to sub-scan, there are cases in which positions at which writing (recording) of the each of the separated images is started on the respective photosensitive materials may be different. Namely, a distance between a predetermined reference position on the photosensitive material (for example, a position of the leading end of the photosensitive material) and a position at which the first main scan is started varies for each of the photosensitive materials. Therefore, as the number of light beams (the beam number of multi-beam) in one main scan increases, the above-described distance (in the direction in which the photosensitive material is conveyed) may become longer.

For this reason in the first main scan, blank raster lines of non-image data are set. Namely, by setting a non-recording region (line) on the photosensitive material, an actual position at which recording of an image is started can be displaced backward in the direction in which the photosensitive material is conveyed, and the positions at which recording of the images are started on the photosensitive materials can be made coincident with one another.

An optical system used for the main scan, for example, a polygon mirror or a resonant mirror, is provided to mechanically swing (rotate) a surface by which a light beam is reflected so as to distribute the light beam on the photosensitive material in a main scan direction. For this reason, when the photosensitive material is conveyed to a position in which recording of an image can be started immediately after the optical system is brought into an initial state (that is, a state in which main scan for the photosensitive material can be started), recording of the image is cannot be carried out until the optical system is brought into the initial state again. On the other hand, when the optical system is brought into the initial state synchronously with (or immediately after) the photosensitive material having been conveyed to the position at which recording of an image can be started, recording of the image can be started immediately.

As described above, when the time at which the main scan is started varies greatly, the relative positions of the separated images on the respective photosensitive materials do not coincide with one another due to sub-scan for the photosensitive material is being continuously carried out.

Accordingly, as described in the second and fifth aspects of the present invention, the number of blank raster lines in the first main scan is set for each section of the photosensitive material, based on a distance between a predetermined reference position on each section of the photosensitive material and a position at which the first main scan is started on that section, also, the blank raster lines are set in order from a leading end of the sheet of photosensitive material, the blank lines being substantially transverse to a direction in which the sheet of photosensitive material is conveyed.

For this reason, based on the distance in the direction in which the photosensitive material is conveyed, in the first main scan, blank raster lines of non-image data are set sequentially from the leading end of the photosensitive material in the direction in which the photosensitive material is conveyed. Namely, by setting a non-recording region (line) on the photosensitive material, an actual position at which recording of an image is started can be displaced, based on the distance in the conveying direction, backward in the direction in which the photosensitive material is conveyed, and the positions at which recording of the images are started on the photosensitive materials can be made coincident with one another.

As a result, the relative positions of the separated images on the respective photosensitive materials can be made coincident with one another.

A sixth aspect of the present invention is an image recording apparatus in which an image is recorded by applying a plurality of light beams (for example, N light beams) on photosensitive materials for each of the colors C, M, Y, and K which are required for forming a so-called full-color image or the like. According to the sixth aspect of the present invention, the state in which the photosensitive material is conveyed to the position at which recording of an image can be started is detected by the photosensitive-material detecting means (sensor), and subsequently, the state in which main scan by the plurality of light beams can be started is detected by a means (sensor) for detecting the state in which a main scan can be started.

When the state in which main scan by the plurality of light beams can be started is detected by the sensor for detecting the state in which a main scan can be started after the state in which the photosensitive material is conveyed to the position at which an image can be recorded is detected by the photosensitive-material detecting sensor, namely, after a predetermined signal is outputted from the photosensitive-material detecting sensor and when a predetermined signal is outputted from the sensor for detecting the state in which a main scan can be started, the sensor for controlling start of main scan which is provided to control the image recording means (section) starts main scan. At this time, the position at which recording of an image is started on each photosensitive material may be displaced in the sub-scan direction by an amount W of movement for one sub-scan at the maximum. The amount W of movement for one sub-scan corresponds to an amount by which the photosensitive material is conveyed in one main scan, and as the number of light beams increases, the amount W of movement becomes larger.

A calculation means (data processor) calculates an amount L by which the photosensitive material is conveyed during a time between a time at which the state in which the photosensitive material is conveyed to the position in which an image can be recorded is detected by the photosensitive-material detecting sensor, and a time at which the state in which main scan by the plurality of light beams can be started is detected by the sensor for detecting the state in which main scan can be started. The ratio R ($0<R\leq 1$) of the amount L by which the photosensitive material is conveyed with respect to the amount W of movement for one sub-scan is obtained.

In the first main scan as in the seventh to tenth aspects of the present invention, blank raster lines whose number increases as the ratio R becomes smaller are set, based on the above-described ratio R, sequentially from the leading end of the photosensitive material in the direction in which the photosensitive material is conveyed. The upper limit of the number of blank raster lines is smaller than the number N of light beams by one.

Accordingly, in the case of "the most suitable timing", the first main scan lines, N−1, are blank raster lines, and the position at which recording of an image is started in the case of "the most unsuitable timing" is displaced only by a pitch of one line at the maximum. As a result, an image of high quality in which no color displacement occurs can be obtained.

According to the sixteenth aspect of the present invention, when one image is formed by superposing images recorded on the photosensitive materials one another, it is important that these images be registered. Further, it is necessary that relative positions of images and photosensitive materials be provided to coincide with one another.

When an image is recorded by carrying out main scan repeatedly while moving the light beams relative to the sub-scan direction of the photosensitive material, a position at which writing is started may vary between photosensitive materials. Namely, the time that the relative position between the photosensitive material and the light beams reaches from a predetermined reference position on the photosensitive material (for example, a leading end of the photosensitive material) to the position of a line at which main scan is started has no correlation with one another, and therefore, as the number of multi-beams increases, an amount of displacement in the sub-scan direction becomes larger.

For this reason, based on the amount of displacement of the photosensitive material in the sub-scan direction, blank raster lines of non-image data are set sequentially from the top of the plurality of light beams during the first main scan. Namely, by providing lines apparently having nothing recorded therein, a leading end of an image is displaced backward in the sub-scan direction of the photosensitive material by a region of the blank raster lines so as to correspond to a photosensitive material displaced by the largest amount.

According to the seventeenth aspect of the present invention, an amount of displacement of the photosensitive material in the sub-scan direction from a predetermined reference position (for example, the leading end of the photosensitive material) to the position of a line at which main scan is started is obtained.

An optical system used for the main scan, for example, a polygon mirror or a resonant mirror, is provided to mechanically swing (rotate) a surface by which a light beam is reflected so as to distribute the light beam on the photosensitive material in a main scan direction. For this reason, when the photosensitive material and the light beam reach the relative position of a line at which main scan is started immediately after the optical system passes an initial position, recording of the image cannot be carried out until the optical system is brought into the initial state again. On the other hand, when the optical system is brought into the initial state immediately after the photosensitive material and the light beam has reached the relative position of a line at which main scan is started, recording of the image can be started immediately.

As described above, when the time at which the main scan is started varies greatly, the relative positions of images on the photosensitive materials do not coincide with one another due to sub-scan for the photosensitive material being continuously carried out.

The number of blank raster lines are set sequentially from a leading end in the sub-scan direction of a photosensitive material at a position of a line at which main scan is started, which the position is displaced by the largest amount, in the main scan for other photosensitive materials, and the top of lines not including the blank raster lines is set as an apparent line at which recording of an image is started. As a result, the photosensitive material displaced by the largest amount is limited to an amount of displacement of pitch of one line at the maximum, and therefore, the amount of displacement can be regarded as that in an allowable range.

The eighteenth aspect of the present invention is an apparatus for recording an image by applying a multi-beam (N light beams) to four sheets of photosensitive material for colors of C, M, Y, and BK which are required for forming a so-called full-color image. According to this aspect, the position of a line at which main scan is started is detected by the photosensitive-material detecting means, and subsequently, the position at which recording of an image is started is detected by the start-of-main-scan detecting means.

The calculation means calculates the amount of relative movement L between the photosensitive material and the light beam until the main scan is started from the relative position of a line at which main scan is started between the photosensitive material and the light beam, and the ratio R ($0 \leq R < 1$) of the amount of movement L to the amount of movement W in one sub-scan is obtained.

Blank raster lines whose number increases as the ratio R becomes smaller are set, based on the above-described ratio R, sequentially from the leading end of the photosensitive material in the direction in which the photosensitive material is conveyed (blank raster line setting means). The upper limit of the number of blank raster lines is smaller than the number N of light beams by one.

Accordingly, in the case of "the most suitable timing", the first main scan lines, N−1, are blank raster lines, and the position at which recording of an image is started in the case of "the most unsuitable timing" is displaced only by a pitch of one line at the maximum. As a result, an image of high quality in which no color displacement occurs can be obtained.

BRIEF DESCRIPTION OF THE DRAWINGS

FIG. 1 is a schematic structural diagram of a film setter according to an embodiment of the present invention.

FIG. 5 is a control routine of image recording for a photographic film for plate-making.

FIG. 6 is a sub-routine showing details of image recording processing.

FIG. 7 is a diagram comprised of a plurality of patterns for determining a number S of blank raster lines at an initial stage of main scan.

DESCRIPTION OF THE PREFERRED EMBODIMENTS

Figure 2:
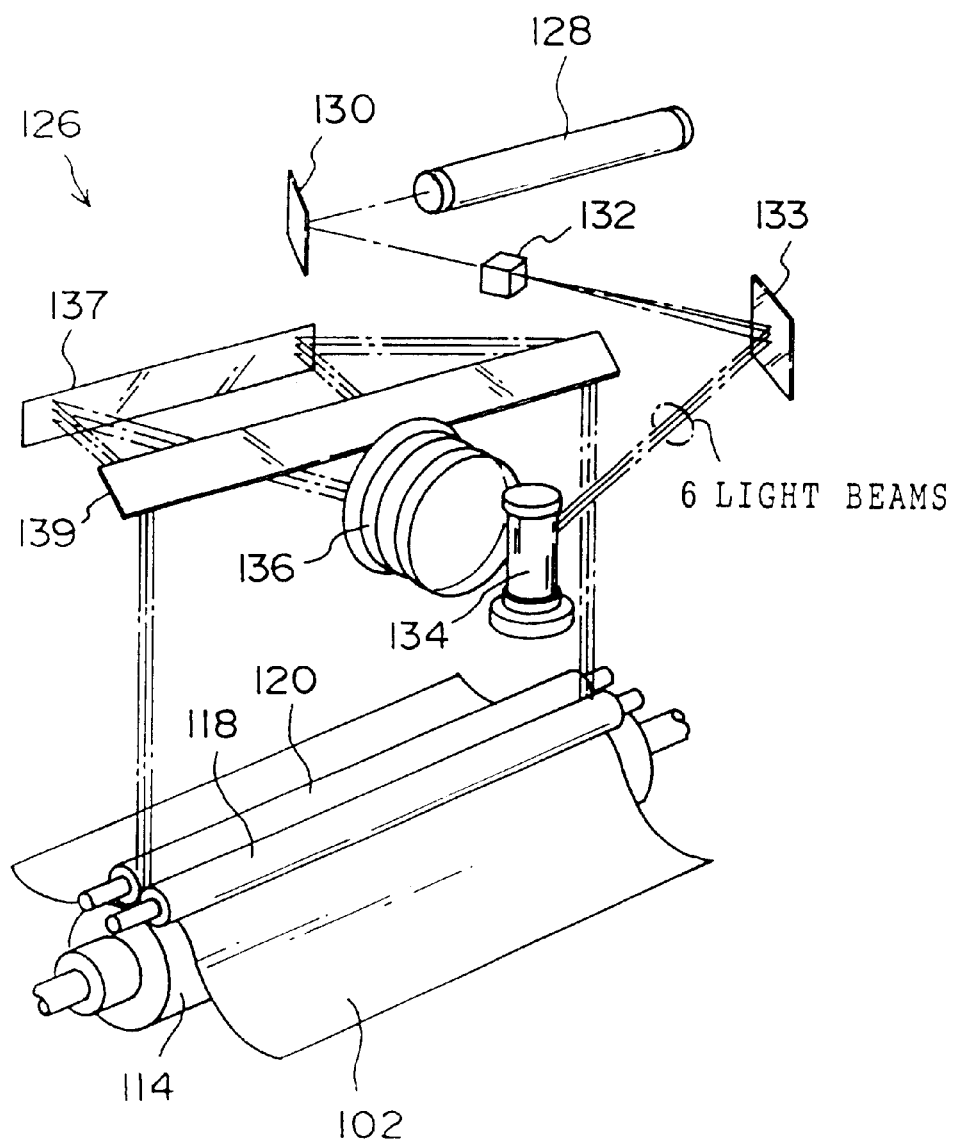
FIG. 2 is a perspective view of an image exposure section.

FIG. 1 shows a schematic structural diagram of a film setter 100 which serves as an image processing apparatus for a photographic film for plate-making according to the present invention.

A photographic film for plate-making 102 is wound into a reel 104 in an elongated state and is accommodated in a magazine 106. The magazine 106 can be loaded at a predetermined position in an apparatus main body 108.

The photographic film for plate-making 102 pulled out from the magazine 106 is nipped by a pair of conveying rollers 110A and 110B formed as a feed roller 110.

One conveying roller 110A (or 110B) of the feed roller 110 receives driving force from a motor 112 via speed changing means (not shown). The photographic film for plate-making 102 is pulled out from the magazine 106 by being nipped by the conveying rollers 110A and 110B and is conveyed to an exposure drum 114.

The exposure drum 114 receives driving force of the motor 116 via speed changing means (not shown) and is driven to rotate at the same linear velocity as that at which the photographic film for plate-making 102 is conveyed by the feed roller 110 (that is, the speed at which the photographic film for plate-making 102 is conveyed by the feed roller 110 is equal to that at which the photographic film for plate-making 102 is conveyed by the exposure drum 114).

Nip rollers 118 and 120 are disposed at two different positions on a peripheral surface of the exposure drum 114.

The surface of the nip roller 118 is made of metal. The photographic film for plate-making 102 sent out from the feed roller 110 is inserted and nipped between the nip roller 118 and the exposure drum 114. The photographic film for plate-making 102 thus nipped is wound onto the peripheral surface of the exposure drum 114. The state in which the film 102 is wound onto the exposure drum 114 is continuously maintained to a position where the film 102 is subsequently nipped by another nip roller 120 and the exposure drum 114.

The surface of the nip roller 120 is made of rubber. The photographic film for plate-making 102 is separated from the exposure drum 114 at the position between the nip roller 120 and the exposure drum 114 and is conveyed to an ordinary conveying path NR formed by arrangement of a plurality of conveying roller pairs 122.

The motors 112 and 116 drive to allow normal rotation and reverse rotation of the feed roller 110 and the exposure drum 114 based on a control signal from a controller 124. Namely, during ordinary normal rotation of the exposure drum 114, the exposure drum 114 receives the photographic film for plate-making 102 from the feed roller 110 and conveys the same to the ordinary conveying path NR, but during reverse rotation of the exposure drum 114, the exposure drum 114 can also convey the photographic film for plate-making 102 back to the feed roller 110.

The controller 124 adjusts driving torque of the exposure drum 114 by the motor 116 for rotating the exposure drum 114. Namely, the exposure drum 114 is controlled so as to rotate at a relatively high torque during the normal rotation and rotate at a relatively low torque during the reverse rotation.

The low torque is set such that when the photographic film for plate-making 102 is nipped and conveyed (backward) by the nip rollers 118, 120, and the exposure drum 114, the photographic film for plate-making 102 is strained at a predetermined tension without being broken.

Above a region in which the photographic film for plate-making 102 is wound onto the exposure drum 114, an image recording section 126 is disposed.

As shown in FIG. 2, the image recording section 126 includes a helium-neon laser 128 (hereinafter referred to simply as a laser 128).

The controller 124 stores therein image information, and based on the stored image information, the controller 124 controls an acoustooptic element (AOM) 132 so that output of a plurality of light beams (an on-off action of light beams) is controlled.

A light beam outputted from the laser 128 is inputted to the AOM 132 via a reflecting mirror 130 and divided into a plurality of light beams (in the present embodiment, six light beams) and further inputted to a resonant scanner 134 via a reflecting mirror 133. The resonant scanner 134 has a function of distributing six light beams so that the six light beams are scanned along a main scan direction of the photographic film for plate-making 102. The light beams distributed in the resonant scanner 134 are scanned on the exposure drum 114 via a scanning lens 136 and two reflecting mirrors 137 and 139. The six light beams are arranged in a sub-scan direction on the photographic film for plate-making 102 and an image corresponding to six main scan lines is recorded on the photographic film for plate-making in one main scan.

At this time, the exposure drum 114 rotates at a constant speed to thereby allow the photographic film for plate-making 102 to move in the sub-scan direction. For this reason, the photographic film for plate-making 102 is subjected to sub-scan while six main scan lines are being recorded thereon, and by repeatedly carrying out the above-described processing, an image based on the image information can be recorded on the photographic film for plate-making 102.

A leading-end detecting sensor 115 for detecting a leading end of the photographic film for plate-making 102 in a direction in which the film is conveyed is disposed in the vicinity of the exposure drum 114 and a determination is made by the sensor 115 as to whether the photographic film for plate-making 102 reaches a position where an image can be recorded thereon.

Accordingly, after the leading end of the photographic film for plate-making 102 has been detected by the leading-end detecting sensor 115, recording of an image is started from the time at which the resonant scanner 134 is brought into an initial state which will be described later.

A cutter portion 138 is disposed along the ordinary conveying path NR so as to allow the photographic film for plate-making 102 having an image recorded on the exposure drum 114 to be cut to a predetermined length. The photographic film for plate-making 102 as cut into a sheet is discharged from the film setter 100 and conveyed to a developing apparatus (not shown) in a subsequent process.

The film setter 100 of the present embodiment is equipped with a punch unit 140 by which a positioning punch hole is formed in the photographic film for plate-making 102.

The punch unit 140 is provided at the end of a branch path DR branched out from the ordinary conveying path NR at a downstream side of the exposure drum 114.

The branch path DR starts from a point at which the photographic film for plate-making 102 is nipped by the nip roller 120 and the exposure drum 114, and is formed so as to extend from the starting point thereof downward a little more than the ordinary conveying path NR (in a lower left direction on the paper of FIG. 1 at an angle of about 45 degrees to the direction of the ordinary conveying path NR).

A determination as to whether the photographic film for plate-making 102 is guided to the ordinary conveying path NR or guided to the branch path DR is made by the necessity for formation of a punch hole, or not. Based on this determination, a movable guide portion 142 guides the photographic film for plate-making 102 in a desired direction.

Figure 3A:
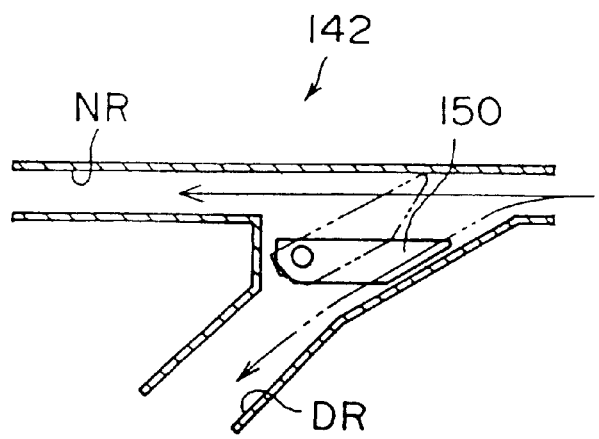
FIG. 3A is a schematic diagram of a movable guide portion applied to the embodiment of the present invention.

As shown in FIG. 3A, the movable guide portion 142 includes, at a branch point of the ordinary conveying path NR and the branch path DR, a point 150 whose one end is supported in a swingable manner, and by swinging the point 150, any one conveying path can be selected.

Figure 3B:
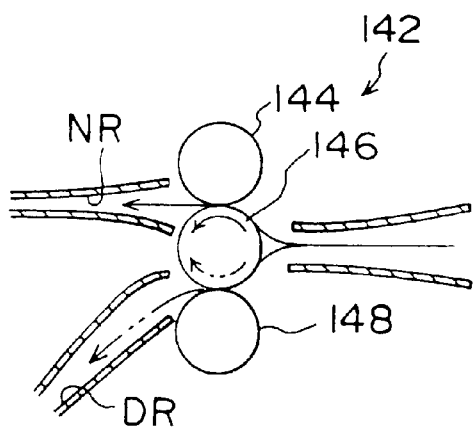
FIG. 3B is a schematic diagram of a movable guide portion according to a modified example.

As another structure of the movable guide portion 142, as shown in FIG. 3B, three rollers 144, 146, and 148 may be used to form the same. The three rollers 144, 146, and 148 are arranged in a vertical direction into contact with one another. The central roller 146 is a driving roller which rotates in normal and reverse directions.

When the photographic film for plate-making 102 is guided to the ordinary conveying path NR, the central roller 146 is rotated in a counterclockwise direction. As a result, the photographic film for plate-making 102 is nipped by the upper roller 144 and the central roller 146 and is guided and conveyed to the conveying path NR. When the leading end of the photographic film for plate-making 102 is conveyed to a lower side of the central roller 146, the leading end of the photographic film for plate-making 102 is pushed up toward the central roller 146 by the rotation of the lower roller 148.

On the other hand, when the photographic film for plate-making 102 is guided to the branch path DR, the central roller 146 is rotated in a clockwise direction. As a result, the photographic film for plate-making 102 is nipped by the lower roller 148 and the central roller 146 and is guided and conveyed to the branch path DR. When the leading end of the photographic film for plate-making 102 is conveyed to an upper side of the central roller 146, the leading end of the photographic film for plate-making 102 is pushed down toward the central roller 146 by the rotation of the upper roller 144.

The conveying path may be changed in a point-switching manner by providing a conveying guide plate for changing the conveying path without using the three rollers 144, 146, and 148.

A guide plate 152 is disposed on the branch path DR between the exposure drum 114 and the punch unit 140 so that the photographic film for plate-making 102 can reliably be conveyed to the punch unit 140.

The punch unit 140 is connected to the controller 124 via a driver 154. The punch unit 140 is equipped with a male cutting part and a female cutting part. The male cutting part is moved by driving force of the driver 154 in a state in which the photographic film for plate-making 102 is interposed between the male and female cutting parts, and is further engaged with the female cutting part. As a result, a punch hole of a predetermined shape (for example, a circular hole) is formed in the photographic film for plate-making 102.

Further, a leading-end detecting sensor 156 is provided in the punch unit 140 and controls so that the male cutting part is engaged with the female cutting part at the point in time of detecting the leading end of the photographic film for plate-making 102.

The state in which the male cutting part is engaged with the female cutting part is maintained for a predetermined time, and thereafter, this state is cancelled. During the above-described state, the photographic film for plate-making 102 is conveyed backward by the reverse rotation of the exposure drum 114 and a slack of the photographic film for plate-making 102 formed between the exposure drum 114 and a position at which the male and female cutting parts are engaged is eliminated. The photographic film for plate-making 102 is thereby brought into a state of strain or tension. In this case, the exposure drum 114 rotates in reverse at a low torque as described above, and therefore, there is minimal risk of the photographic film for plate-making 102 being broken.

A rotary encoder 158 is mounted to the exposure drum 114 and an output signal of the rotary encoder 158 is supplied to the controller 124. The controller 124 resets the output signal from the rotary encoder 158 a predetermined time after the reverse rotation of the exposure drum 114 is started, and counts the output signals until the leading end of the photographic film for plate-making 102 reaches an exposure starting position in the image recording section 126.

Figure 4A:
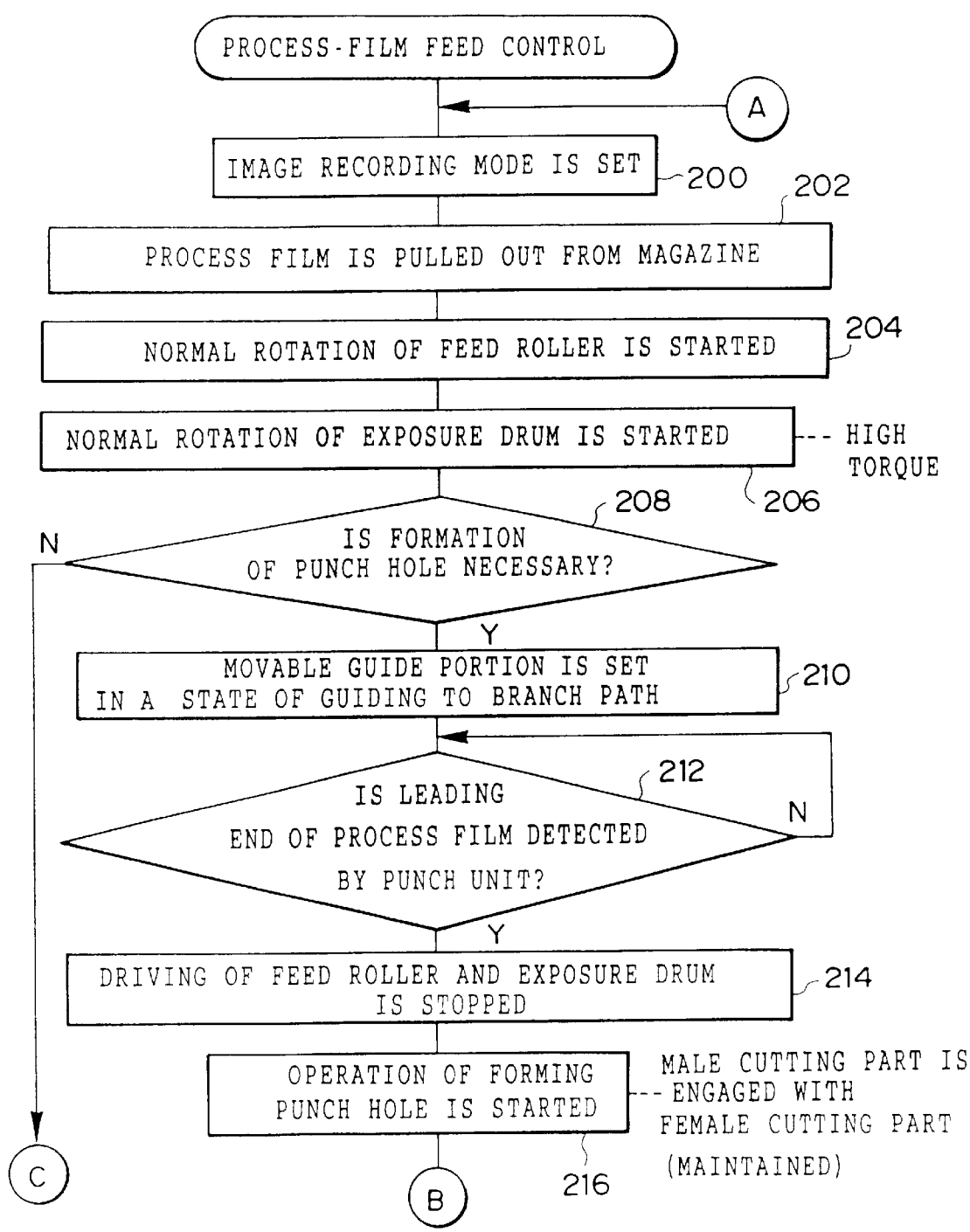
FIG. 4A and FIG. 4B are photographic film for plate-making feed control routine.
Figure 4B:
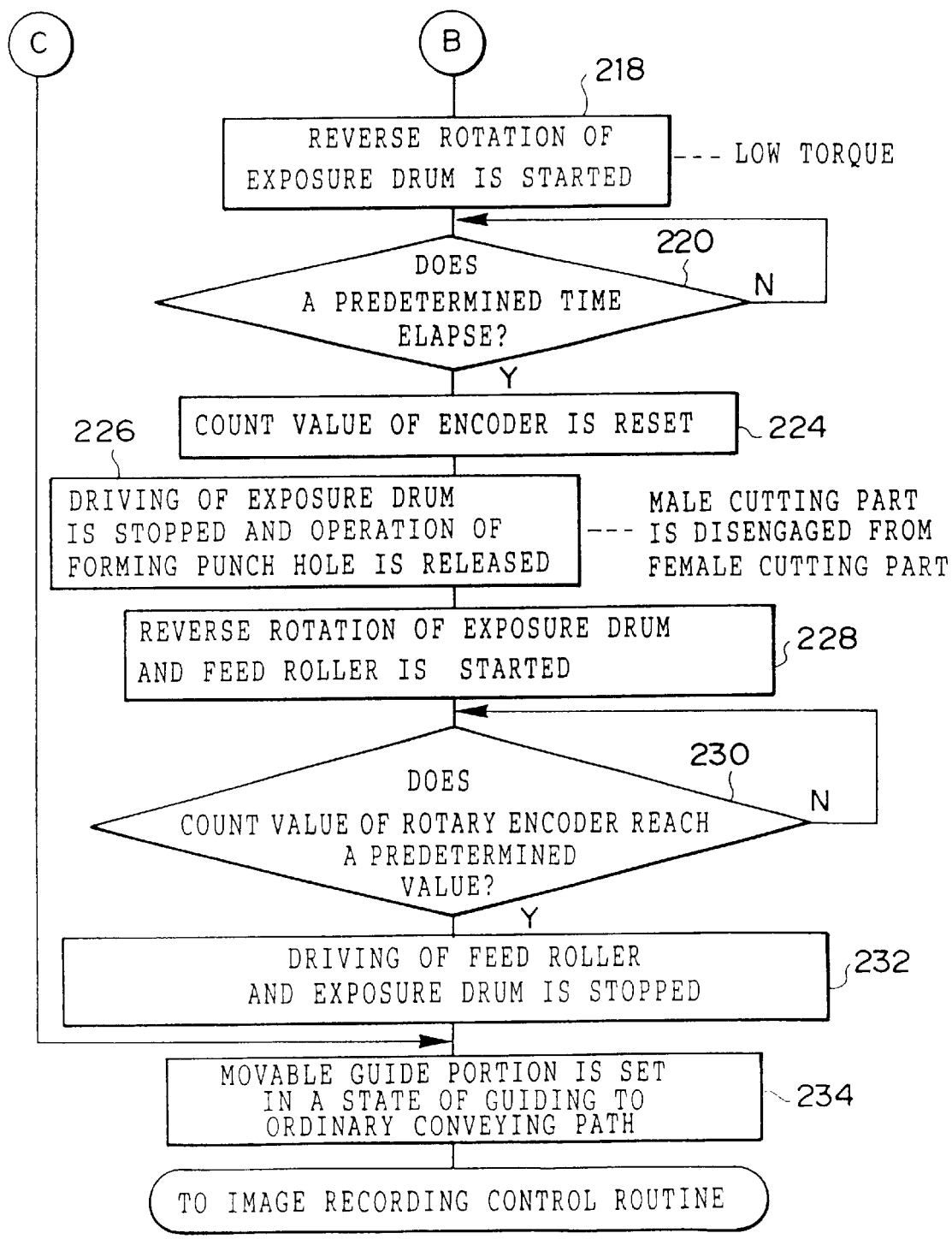

In FIG. 4A and FIG. 4B, in step 200, an image recording mode is inputted and set by an operation panel (not shown). This recording mode is provided to make a determination as to whether an image to be recorded is a monochrome (black-and-white) image or a color image. In a case of a monochrome image, one photographic film for plate-making 102 is prepared. In a case of a color image, four photographic films for plate-making 102 for colors of C, M, Y, and K are prepared.

In step 202, the photographic film for plate-making 102 is pulled out from the magazine 106. In the subsequent steps 204 and 206, the feed roller 110 is driven to rotate in a normal direction and the exposure drum 114 is also driven to rotate in a normal direction.

In step 208, it is determined whether formation of a punch hole is required. Namely, a determination is made as to whether formation of a punch hole for positioning the four photographic films for plate-making 102 which are required for a color image is necessary. This determination depends on the recording mode set in step 200.

When it is determined that formation of a punch hole is necessary in step 208, that is, when an image to be recorded is a color image, the process proceeds to step 210, in which the movable guide portion 142 is set in a state of guiding a film to the branch path DR.

As a result, the photographic film for plate-making 102 nipped and conveyed by the feed roller 110 and wound onto a portion of the peripheral surface of the exposure drum 114 by the nip rollers 118 and 120 is conveyed to the end of the branch path DR at which the punch unit 140 is disposed.

In step 212, it is determined whether the leading end of the photographic film for plate-making 102 is detected in the leading-end detecting sensor 156 provided in the punch unit 140. When the decision of step 212 is made affirmative, the process proceeds to step 214, in which driving of the feed roller 110 and the exposure drum 114 is stopped.

In the subsequent step 216, the male cutting part is engaged with the female cutting part so as to allow formation of a punch hole.

In step 218, the exposure drum 114 is driven to rotate in a reverse direction. At this time, in the present embodiment, the male cutting part is in an insertion state in the punch hole, that is, engaged with the female cutting part. For this reason, if there was slack in the photographic film for plate-making 102, the slack is eliminated and the photographic film for plate-making 102 is strained or tensioned.

In the present embodiment, the exposure drum 114 is rotated in the reverse direction at a low driving torque. Accordingly, the photographic film for plate-making 102 is maintained at a predetermined amount of tension, when the photographic film for plate-making 102 is in the state of being tensioned or strained, so that there little possibility that a region of the photographic film for plate-making 102 in the vicinity of the punch hole will be broken or ripped by the male cutting part.

When it is determined that a predetermined time has elapsed in step 220, in step 224, a count value in the rotary encoder 158 is reset. Namely, the count value is reset when the photographic film for plate-making 102 is at a predetermined amount of tension or strain between the exposure drum 114 and the punch unit 140, and therefore, the count value can be reset under the same conditions each time (and at the same position).

In step 226, driving of the exposure drum 114 is stopped so that the male cutting part held in a state of being engaged with the punch hole, is disengaged from the female cutting part (the punching operation is terminated). In step 228, the exposure drum 114 and the feed roller 110 are driven to rotate in the reverse direction.

When the photographic film for plate-making 102 is conveyed backward after the punching operation has been terminated, the count value of rotary encoder 158 mounted to the exposure drum 114 is counted from a reset state. The photographic film for plate-making 102 is conveyed backward until the count value reaches a predetermined value.

When in step 230 it is determined that the count value of the rotary encoder 158 reaches the predetermined value, the process proceeds to step 232, in which the reverse rotation of the feed roller 110 and the exposure drum 114 is stopped, and thereafter, the process further proceeds to step 234.

When in step 208 it is determined that the formation of the punch hole is not necessary, that is, when an image to be recorded is a monochrome image, the process proceeds from step 208 to step 234. In step 234, the movable guide portion is set in a state of guiding the film to the ordinary conveying path NR and the process proceeds to an image recording control routine shown in FIG. 5.

As shown in FIG. 5, in step 250, the feed roller 110 and the exposure drum 114 are driven to rotate in a normal direction, and in the subsequent step 252, it is determined whether the leading end of the photographic film for plate-making 102 is detected by the leading-end detecting sensor 115 in the vicinity of the exposure drum 114.

When the decision of step 252 is made affirmative, it is determined that the leading end of the photographic film for plate-making 102 has reached a predetermined position, and in step 254, image recording processing is performed. In the image recording processing, main scan of a multi-beam (six light beams) is started, synchronously with a signal indicating that the resonant scanner 134 in a state in which main scan of the photographic film for plate-making 102 can start (that is, an initial state). Sub-scanning is continuously carried out due to rotation of the exposure drum 114. Therefore, recording for an amount of one image ends after repeated main scans as above-described. The image recording processing will be described later with reference to the flow charts shown in FIGS. 6 and 7.

When the sub-scan is carried out for a predetermined region of the film after completion of the image recording (step 256). Namely, when the photographic film for plate-making 102 is conveyed a predetermined amount, driving of the feed roller 110 and the exposure drum 114 is stopped (step 258). In step 260, the cutter portion 138 is operated to cut the photographic film for plate-making 102 into a plurality of sheets every one image. The photographic films for plate-making 102, after they have been cut into sheets, are nipped and conveyed by the conveying roller pairs 122 and discharged from the film setter 100.

In step 262, the remaining photographic film for plate-making 102 (in an elongated or un-cut state) is conveyed backward by rotating the feed roller 110 and the exposure drum 114 in reverse.

In step 264, it is determined whether the count value of the rotary encode 158 has reached a predetermined value during the backward conveying of the film. When the decision of step 264 is affirmative, it is determined that the count value has reached the same value as in step 230 in FIG. 4. Thus in step 266, the reverse rotation of the feed roller 110 and the exposure drum 114 is stopped.

In step 268, it is determined whether the processing must continue. If processing must continue, the process returns to step 200 in FIG. 4. Otherwise, the process ends.

FIG. 6 shows a sub-routine of the image recording processing.

In step 270, the feed roller 110 and the exposure drum 114 are driven to rotate in the normal direction. In the subsequent step 272, it is determined whether the film has reached the position of a line at which main scan is started.

When the decision of step 272 is affirmative, a signal indicating starting of image recording is output (step 274).

In step 276, a ratio R of an amount L by which the photographic film for plate-making 102 moves in the sub-scan direction, which amount corresponds to a time difference between a time at which the signal which indicates starting of image recording is outputted, and a time at which a signal indicating that the resonant scanner is brought into the above-described initial state is outputted, and one sub-scan width W (an amount by which the photographic film for plate-making 102 moves in the sub-scan direction during one main scan), that is, L/W=R, is calculated. Subsequently, in step 278, based on the calculated ratio R, the number S of blank raster lines in a region (initial region) of the photographic film for plate-making 102 on which six lines (image) are to be recorded in the first main scan after outputting of the signal which indicates starting of image recording is set.

In the description given below, the amount L by which the film moves, and the sub-scan width W are each would be represented by the number of lines recorded on the photographic film for plate-making 102 by the main scan of light beams.

In step 280, image data is read based on the set number S of blank raster lines.

The position at which recording (writing) on the photographic film for plate-making 102 is started greatly varies between "the most suitable timing" (when the time difference between the time at which the signal which indicates starting recording of an image is outputted, and the time at which the signal which indicates that the resonant scanner is brought into the above-described initial state is outputted is the shortest) and "the most unsuitable timing" (when the time difference between the time at which the signal which indicates starting recording of an image is outputted, and the time at which the signal which indicates that the resonant scanner is brought into the above-described initial state is outputted is the longest). Namely, the position at which recording on the photographic film for plate-making 102 is started at "the most unsuitable timing" is displaced from that at "the most suitable timing" by an amount by which the photographic film for plate-making 102 moves in the sub-scan direction during one main scan. In the present embodiment, the number N of multi-beam is 6, and therefore, respective recording start positions at "the most unsuitable timing" and "the most suitable timing" are displaced from each other by an amount of 6 lines.

The main scan line width is about 10 $\mu$m and an allowable range of color displacement in a print is 100 $\mu$m at its maximum. When an amount of displacement of the recording start position is that of 6 lines, that is, 60 $\mu$m, it amounts to a larger part of the allowable range. In this case, when displacement caused by other factors (for example, positioning of four sheets of photographic film for plate-making 102) occur, a total amount of displacement immediately exceeds the allowable range, thereby resulting in deterioration of the quality of a finished image.

Accordingly, in the present embodiment, based on the above-described ratio R (=L/W), in the first main scan, only one line is recorded at the lowest end (a position at which a sixth line is to be recorded) in a region of the photographic film for plate-making 102 on which 6 lines are to be recorded, that is, an initial region. Blank raster lines are "recorded" in a remaining region of the initial region (in which the first to fifth lines are to be recorded). Namely, nothing is recorded in the region in which the first to fifth lines are recorded in the first main scan. As a result, in a conventional system, the recording start position on the photographic film for plate-making 102 at "the most unsuitable timing" and the recording start position on the photographic film for plate-making 102 in cases other than "the most unsuitable timing" are displaced from each other by the amount of 6 lines at the maximum. However, in the present embodiment, the amount of displacement between the respective recording start positions is limited to one line at the maximum.

As shown in FIG. 7, a pattern A indicates a case in which the resonant scanner 134 is brought into the above-described initial state immediately after the photographic film for plate-making 102 has reached the position of a line at which main scan is started, and is an example of "the most suitable timing". For this reason, 6 light beams can all be written in the above-described initial region. However, in the present embodiment, even in this case, five light beams are used as blank raster lines, and only one line is recorded at the lowest end of the initial region with no line being recorded in the region in which the first to fifth lines are to be recorded.

Patterns B to F each indicate an example in which the resonant scanner 134 is brought into the above-described initial state after the photographic film for plate-making 102 has reached the position of a line at which main scan is started. The number S of blank raster lines is determined in each of the examples. Namely, as the time difference between the time at which the signal which indicates starting of image recording is outputted and the time at which the signal which indicates that the resonant scanner is brought into the above-described initial state is outputted becomes short, the number S of blank raster lines increases. Further, as the time difference between the time at which the signal which indicates starting of image recording is outputted and the time at which the signal which indicates that the resonant scanner is brought into the above-described initial state is outputted becomes longer, the number S of blank raster lines decreases.

The pattern F indicates an example in which the resonant scanner 134 is brought into the initial state immediately before the photographic film for plate-making 102 reaches the position of a line at which main scan is started, and is an example of "the most unsuitable timing". In this case, the photographic film for plate-making 102 is conveyed in the sub-scan direction for the longest time until the first main scan starts.

The above-described pattern A is set as the maximum value, N−1, of the number S of blank raster lines, and subsequently, by setting respective regions of the patterns B to F and decreasing the number S of blank raster lines one by one, only remaining lines which are other than the blank raster lines at the first scan are recorded based on image data. As a result, even in a case of image recording based on any pattern, the amount of displacement can be limited to one line at the maximum.

In step 282 shown in FIG. 6, main scan is started. The first main scan for the photographic film for plate-making 102 is carried out based on the number S of blank raster lines, which is determined in accordance with any one of the above-described patterns A to F. The amount of displacement between the four sheets of photographic film for plate-making 102 in the case of a color image is a width of one line at the maximum and no more displacement is caused. As a result, deterioration of image quality, such as color displacement can be reduced. Further, the amount of displacement is thus reduced, and therefore, displacement caused by other factors (for example, positioning of a punch hole) is allowable to a certain extent, and an allowable amount of displacement of 100 μm can be effectively utilized.

An image is recorded as raster lines whose number is the same as the number of a plurality of light beams for each main scan, and recording of the image is completed at the point in time that all raster lines of one image plane have been recorded. At this time, at final main scan, the plurality of light beams (in this embodiment, six light beams) are not necessarily used to form image data. In the final main scan, on-off control only for the required number of light beams is made based on image data, and remaining light beams are set as blank raster lines of non-image data. In step 284, it is determined whether the sub-scan for a region of one image is completed. When the decision of step 284 is affirmative, this routine ends.

The image processing apparatus for a photographic film for plate-making shown in FIG. 1 is an example of a system in which light beams are moved relatively to the sub-scan direction of the photosensitive material while conveying the photographic film for plate-making by feed rollers, nip rollers and exposure drum.

On the other hand, the present invention can also be applied to a system in which one image plane is recorded by moving light beams both in the main scan direction and in the sub-scan direction with a photosensitive material being fixed to an inner surface of an exposure drum (i.e., an inner drum system) or to a system in which one image plane is recorded while moving light beams in the sub-scan direction by rotating an exposure drum together with the photosensitive material at a high speed (main scan) with a photosensitive material being wound onto an outer periphery of an exposure drum (i.e., an outer drum system).

What is claimed is:

1. An image recording apparatus for recording an image on photosensitive material, wherein the image is represented by at least two sets of image data separated by color, the apparatus comprising:

an image recording section for recording a separated image corresponding to each set of the image data on a section of the photosensitive material, by carrying out main scanning of the photosensitive material with a plurality of light beams;

a photosensitive material detecting section for detecting that the section of photosensitive material has been conveyed to a position at which the separated image can be recorded thereon;

a state detecting section for detecting a state in which the main scanning by the plurality of light beams can be started;

a controlling section for controlling starting the main scanning by the plurality of light beams when the state detecting section detects the state in which the main scanning by the plurality of light beams can be started after the photosensitive material detecting section detects that the section of photosensitive material has been conveyed to the position at which the separated image can be recorded thereon;

a calculation section for calculating an amount of distance by which the section of photosensitive material is conveyed, between a time when the photosensitive material detecting section detects that the section of photosensitive material has been conveyed to the position at which the separated image can be recorded thereon, and a time when the state detecting section detects the state in which the main scanning by the plurality of light beams can be started; and a setting section for setting a number of blank raster lines in a first main scan of the main scanning for each section of photosensitive material on the basis of the calculated amount of distance by the calculation section.

2. An image recording apparatus according to claim 1, wherein as the amount of distance by which the photosensitive material is conveyed becomes smaller, the number of blank raster lines set by the setting section increases.

3. An image recording apparatus according to claim 1, wherein the upper limit of the number of blank raster lines is smaller than the number of the plurality of light beams by one.

4. An image recording apparatus according to claim 1, wherein the section of photosensitive material includes a leading end and the blank raster lines are set in order from the leading end of the section of photosensitive material in a direction in which the photosensitive material is conveyed.

5. An image recording apparatus according to claim 1, wherein the image recording section has a scanner, from which the plurality of light beams are directed across a conveying path of the photosensitive material for scanning the separated image onto the photosensitive material being conveyed therealong, the state detecting section provides a signal indicative of the state in which the main scanning by the plurality of light beams can be started, the photosensitive material detecting section provides a signal indicative of that the section of photosensitive material has been conveyed to the position at which the separated image can be recorded thereon, the calculation section calculates the amount of distance on the basis of the signals, thereby the separated image for each set of image date is recorded on different sections of the photosensitive material.

6. An image recording apparatus according to claim 5, wherein the scanner is a resonant type scanner.

7. An image recording apparatus according to claim 5, wherein the number of blank raster lines decreases as the amount that the respective section of photosensitive material has been conveyed, increases.

8. An image recording apparatus according to claim 5, wherein the setting section sets the number of blank raster lines based on the amount of distance that the respective section of photosensitive material has been conveyed.

9. An image recording apparatus according to claim 5, wherein the setting section is in communication with the photosensitive material detecting section and the state detecting section.

10. An image recording apparatus according to claim 5, further comprising a blade mounted along a cutting path, which cuts the photosensitive material into different sections.

* * * * *